June 20, 1961 V. SVEC 2,989,642
FUNCTION GENERATOR FOR ELECTRONICALLY INDICATING THE ANGULAR
POSITION OF A ROTATABLE MEMBER
Filed March 3, 1959 2 Sheets-Sheet 2

MULTIVIBRATOR OUTPUT

PHOTOCELL VOLTAGE

INVENTOR

VICTOR SVEC

BY K. G. Doub

ATTORNEY

United States Patent Office 2,989,642
Patented June 20, 1961

2,989,642
FUNCTION GENERATOR FOR ELECTRONICALLY INDICATING THE ANGULAR POSITION OF A ROTATABLE MEMBER
Victor Svec, Glenarm, Md., assignor to The Bendix Corporation, a corporation of Delaware
Filed Mar. 3, 1959, Ser. No. 796,831
5 Claims. (Cl. 250—216)

The primary object of this invention is to provide an improved function generator of that type which utilizes a rotating disc bearing a transparent or cut-out pulse-control pattern and coacting photocell scanning means and associated electronic circuitry for generating an electrical signal or wave form indicative of the annular position of a rotatable member. More specifically, the invention aims to provide a function generator which serves to generate pulses proportional to the angular position of a rotatable member, for example a wind vane, and which does not utilize physical elements or connections susceptible to lost motion or embody other parts which might affect the accuracy of the generator due to wear.

Another object is to provide a function generator of the type specified which is capable of generating a chain of pulses or signals of substantially square wave form varying in width along the time axis as a function of the angular position of a rotatable member.

Another object is to provide a function generator utilizing a rotatable scanning disc bearing a transparent or cut-out pulse-control pattern which in conjunction with a particular arrangement of photocell scanning system and associated electronic pulse-shaping circuitry will produce a series of pulses having the same repetition rate and pulse width for a given angular position of the rotatable member whose angular position is being sensed and differing in rate and width in direct relation to different angular positions of said member.

Briefly stated, the improved function generator as disclosed herein comprises a rotatable scanning disc to which the rotatable member whose angular position is to be sensed is directly connected, said disc being opaque with the exception of a pulse-control pattern in the form of a pair of coacting transparent or open traces or grooves, one of said traces being circular and the other, starting at its origin, progressively diverging from the circular trace or groove proportional to increments of angular position throughout 360 degrees of rotation. This disc is scanned by a light-sensitive device such as a photocell and coacting light source, the photocell being rotated at a constant rate of speed and caused to scan the two grooves of said disc once during each complete revolution, and in so doing generates a chain of signals the distance between any pair of which is a direct function of the angular positon of said disc. Thus for each complete revolution of the constantly rotating photocell, two electrical voltage pulses are generated, the time between these pulses being proportional to the distance between the two grooves and consequently to the angular position of the first disc and the rotatable member which drives the said disc. These pulses are amplified and caused to trigger a bi-stable multivibrator, the output of which may be integrated to drive a suitable indicator or recorder, or said pulses may be utilized for modulating the radio frequency output of a telemetering device.

The above noted and other objects and advantages will become apparent in view of the following description taken in conjunction with the drawing, wherein.

Figure 1:
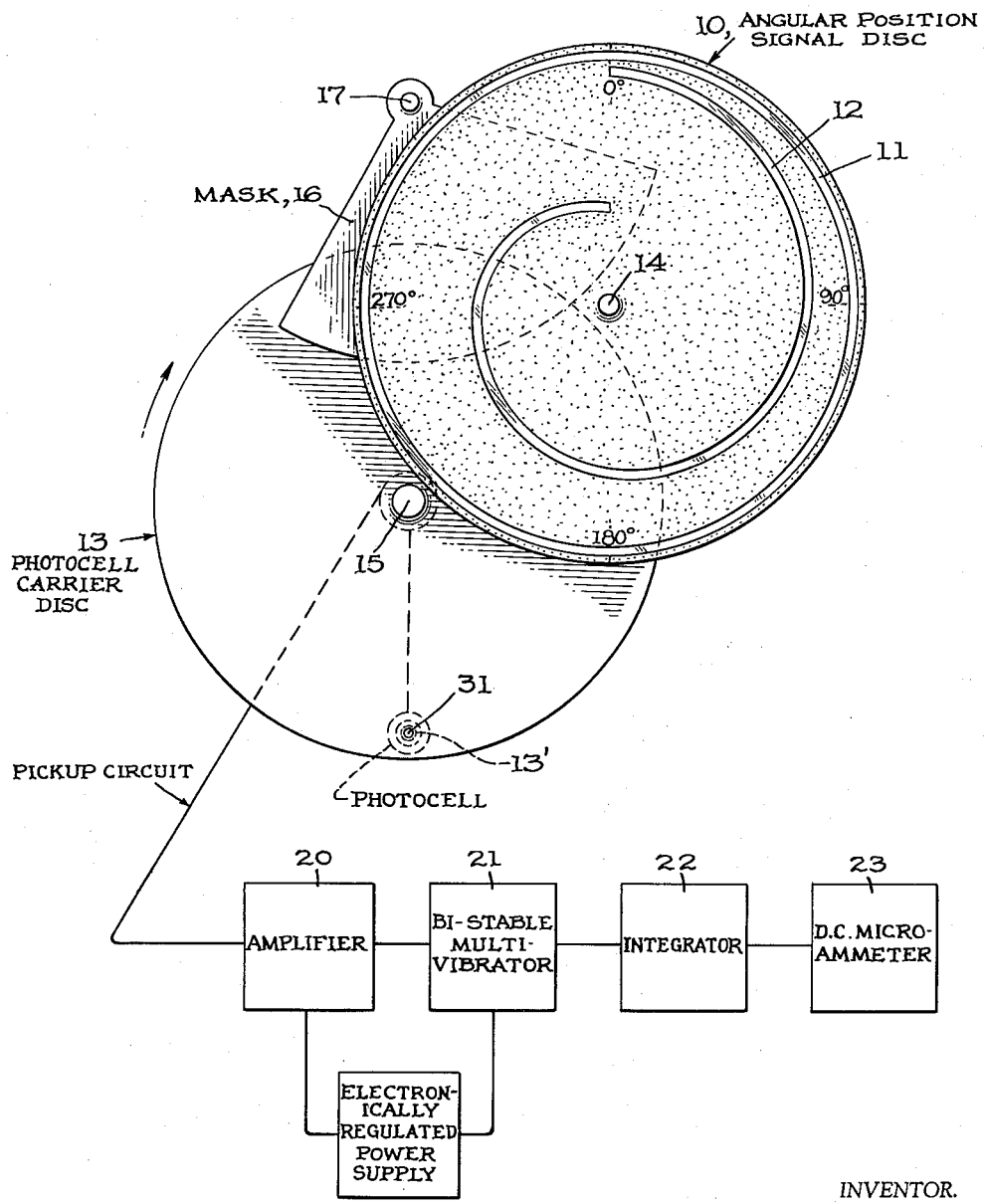
FIG. 1 is a diagrammatic representation of the principal components of a function generator in accordance with the invention.

Referring to the drawings and first to FIG. 1, the numeral 10 indicates an angular-position scanning disc, which is opaque throughout its entire surface with the exception of a pair of transparent coacting circular and spiral signal-generating traces or grooves 11 and 12. The disc 10 may be made of transparent material having one or both of its surfaces coated with an opaque substance and the traces 11 and 12 formed by milling out the opaque substance, leaving a pair of transparent grooves. The groove or trace 11 constitutes a complete circle of 360 degrees, while the groove or trace 12 at its origin is spaced a two-distinct-pulse distance from the groove or trace 11 and gradually diverges from the latter a given increment for each degree in the form of a spiral until at its terminus it is spaced a maximum distance from the groove or trace 11.

A rotatable carrier for a light-sensitive device such as a photocell is indicated at 13; as illustrated it is in the form of a disc which may be made of steel or other material capable of supporting a photocell 13'. The discs 10 and 13 are mounted on shafts 14 and 15, spaced such distance apart as will cause the photocell to traverse the grooves 11 and 12 once during each revolution of the disc 13. To avoid double scanning during each revolution, a mask in the form of a segmental opaque member 16 is adjustably supported on a shaft 17 between the discs 10 and 13; it has an effective area such as to blank off the photocell from the signal grooves 11 and 12 when the photocell sweeps across the grooves the second time during each revolution.

Figure 2:
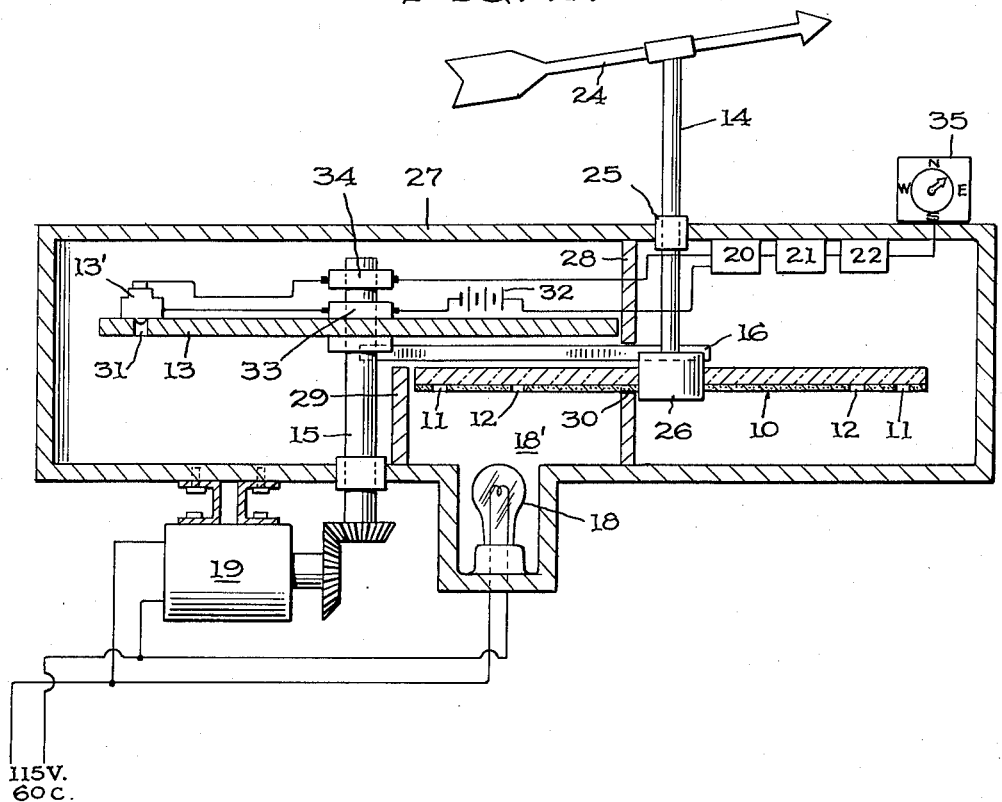
FIG. 2 is a sectional schematic of a physical arrangement of the generator.

A light source, such as the electric lamp 18 of FIG. 2, is located on the side of the disc 10 opposite the photocell carrier 13 in a shielded light chamber 18' and functions to project light rays through the transparent signal traces 11 and 12. The photocell carrier 13 is preferably rotated at a constant rate of speed as by a synchronous motor 19. It will be seen that as the photocell sweeps past or traverses the grooves or traces 11 and 12, it will be energized twice for each complete revolution. The resultant voltage pulses are amplified by an electronic amplifier 20 and caused to trigger a conventional bi-stable multivibrator 21, which produces a chain of pulses varying in width along the time axis in direct proportion to the distance between the grooves, note FIG. 3, which distance is a direct function of the angular position of the signal scanning disc 10. These pulses may be subjected to an integration or smoothing network as at 22 and the output conducted to a direct current microammeter 23 or analogous device which may be used to drive a suitable direction indicator. When it is desired to convey angular position information by air to a remote point, the output of the multivibrator may be used to modulate a radio frequency carrier wave.

FIG. 2 shows a physical embodiment of the function generator in a wind direction indicator. In this instance the shaft 14 is driven by a wind vane 24, said shaft being mounted in bearings 25 and at its inner end terminating in a hub 26 for the signal scanning disc 10. The main parts of the assembly are mounted in a housing 27, having partitions 28 and 29, the partition 28 being formed with a slot 30 to accommodate the disc 10, which, in effect, forms a wall of the light chamber 18'. The photocell 13' is provided with a small lens, which is seated in an opening 31, formed in the carrier disc 13. This opening should be of a diameter less than the distance between the grooves 11 and 12 at the point of origin of the groove 12. Energy may be supplied to the photocell from a suitable source of potential, such as the battery 32, which is in circuit with the said photocell across slip ring 33.

The output from the photocell is conducted to the amplifier 20 across another slip ring 34.

The direct current microammeter in this instance is utilized to drive a wind direction indicator 35 in any conventional manner.

*Operation*

Figure 3:
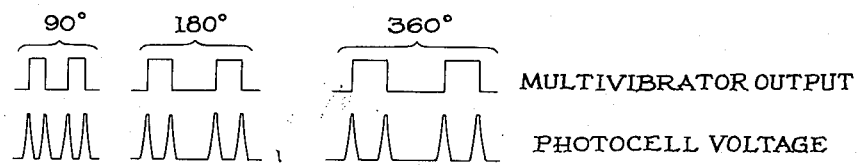
FIG. 3 is an approximate representation of a chain of pulses produced by the generator of FIGS. 1 and 2 at three different angular positions.

From the foregoing description taken in conjunction with the drawings, the operation of the function generator will be apparent to those having a layman's knowledge of the art. When used as a wind direction indicator, as illustrated in FIG. 2, the signal disc 10 is driven by the wind vane 24 and hence its angular position is a true index of wind direction. Since the mechanical connection is direct, there is little chance of play or looseness developing between the driver and the scanning disc 10. A direct connection is usually feasible in view of the negligible loading produced by the disc. Obviously, the light source 18 may be located in any position which will best concentrate the light rays on the signal traces or grooves 11 and 12. Since the photocell carrier disc 13 is driven at a constant rate of speed, the photocell 13' will become energized and deliver its first pulse at the same time during each revolution while its second pulse will be spaced on the time axis in direct relation to the angular position of the signal scanning disc 10. FIG. 3 represents an approximation of the output of the photocell 13' and the multivibrator 21. Thus as long as the disc 10 is held at a given scanning position, as for example a 90 degree position, the photocell output will be characterized by voltage spikes or pulses spaced equally along the time axis as will also the output pulses of the multivibrator 21. In that event, the wind direction indicator arm or pointer would point in a direction corresponding to the angular position of the disc 10 and remain in that position until the said disc was repositioned due to a change in the direction of the wind vane 24. When this happens, the output of the D.C. microammeter 23 will vary and this will in turn reposition the wind indicator arm or pointer 35. In calibrating the apparatus, the angular position of the scanning disc and the rotatable member whose angular position is to be indicated should be angularly related so that for each angular position of the disc 10 there will be a corresponding position for the said member.

In view of the example of one type of installation herein illustrated and described, those skilled in the art can readily adapt the improved generator to sense the angular position of rotatable members other than that shown and the signals amplified and conditioned to drive a suitable indicator, or pulse a telemetering circuit.

What is claimed is:

1. In combination with a rotatable member, a device for generating a voltage pulse as a function of the angular position of said member, comprising a rotatable scanning disc connected to said member to be angularly positioned thereby, said disc in the main being opaque and being provided with a substantially circular light-passing trace and a coacting substantially spiral light-passing trace which at its origin is spaced a given distance radially from said circular trace and gradually diverges from the latter a given increment for each degree of the circle described by said circular trace, a light source arranged to project light rays through said traces, a light-sensitive device, and means for causing said light-sensitive device to traverse said scanning traces on the side of said scanning disc opposite said light source.

2. In combination with a rotatable member, a device for generating a voltage pulse as a function of the angular position of said member, comprising: a rotatable scanning disc connected to said member to be angularly positioned thereby, said scanning disc in the main being opaque and provided with a substantially circular light-passing trace and a coacting substantially spiral trace which at its origin is spaced a given distance radially from said circular trace and gradually diverges from the latter a given increment for each degree of the circle described by said circular trace, a light source positioned to project light rays through said traces, a light-sensitive device, and means for bodily rotating said light-sensitive device at a substantially constant rate of speed past said traces on the side of said scanning disc opposite said light source.

3. In combination with a rotatable member, a device for generating a voltage pulse as a function of the angular position of said member, comprising: a rotatable scanning disc connected to said member to be angularly positioned thereby, said scanning disc in the main being opaque and provided with a substantially circular light-passing trace and a coacting substantially spiral trace which at its origin is spaced a given distance radially from said circular trace and gradually diverges from the latter a given increment for each degree of the circle described by said circular trace, a light source positioned on one side of said scanning disc to project light rays through said traces, a light-sensitive device such as a photocell, means for bodily rotating said light-sensitive device at a substantially constant rate of speed past said traces on the opposite side of said scanning disc, and means for preventing energization of said light-sensitive device during part of its rotation to avoid double scanning of said traces during each revolution of the light-sensitive device.

4. A function generator as claimed in claim 3 wherein said means for preventing energization of said light-sensitive device is in the form of an opaque mask positioned between a segmental portion of said scanning disc and the adjacent path traversed by said light-sensitive device.

5. In combination with a rotatable member, a function generator for producing an electrical output proportional to the angular position of said member comprising: a rotatable scanning disc connected to said member to be angularly positioned thereby, said scanning disc in the main being opaque and provided with a substantially circular light-passing trace and a coacting substantially spiral trace which at its origin is spaced a given distance radially from said circular trace and gradually diverges from the latter a given increment for each degree of the circle described by said circular trace, a light source positioned to project light rays on one side of said disc and through said segmental traces as they are moved into the range of the light source by said rotatable member, a light-sensitive device such as a photocell, a rotatable carrier for said light-sensitive device located on the opposite side of said disc, means for rotating said carrier at a substantially constant rate of speed to cause said light-sensitive device to scan said traces and generate a pair of voltage pulses once during each revolution and which pulses are spaced along the time axis as a function of the angular position of the rotatable member, means whereby the light-sensitive device is caused to scan said traces only once during each revolution of the carrier, and electronic circuitry connected to the output of said light-sensitive device for amplifying and conditioning said voltage pulses to produce an electrical output proportional to the angular position of said rotatable member.

References Cited in the file of this patent

UNITED STATES PATENTS

| | | |
|---|---|---|
| 1,546,193 | Bissiri | July 14, 1925 |
| 1,745,019 | Korn | Jan. 28, 1930 |
| 2,277,285 | Woodling | Mar. 24, 1942 |
| 2,755,020 | Belcher | July 15, 1956 |
| 2,859,915 | Doll | Nov. 11, 1958 |